(12) United States Patent
Weber

(10) Patent No.: US 8,985,660 B1
(45) Date of Patent: Mar. 24, 2015

(54) APPARATUS AND METHOD FOR ACCESSING THE BED OF A PICKUP TRUCK

(76) Inventor: Robert M. Weber, Wasilla, AK (US)

( * ) Notice: Subject to any disclaimer, the term of this patent is extended or adjusted under 35 U.S.C. 154(b) by 246 days.

(21) Appl. No.: 13/347,697

(22) Filed: Jan. 10, 2012

Related U.S. Application Data

(63) Continuation-in-part of application No. 12/175,448, filed on Jul. 17, 2008, now Pat. No. 8,091,943.

(60) Provisional application No. 60/959,724, filed on Jul. 17, 2007.

(51) Int. Cl.
*B60R 3/00* (2006.01)

(52) U.S. Cl.
CPC ...................................... *B60R 3/005* (2013.01)
USPC ............... 296/1.02; 16/422; 280/163; 296/62

(58) Field of Classification Search
CPC .................................. B60R 3/00; B60R 3/005
USPC ............ 16/110.1, 422, 426; 105/447; 182/77, 182/91, 127, 156; 280/14.27, 163, 164.1, 280/166; 296/1.02, 50, 57.1, 62, 106
See application file for complete search history.

(56) References Cited

U.S. PATENT DOCUMENTS

| | | | |
|---|---|---|---|
| 1,233,639 A | 7/1917 | Swartsel | |
| 2,012,528 A * | 8/1935 | Cooper | 296/57.1 |
| 3,162,867 A * | 12/1964 | Hoffman | 5/507.1 |
| 3,539,033 A * | 11/1970 | Schwarz et al. | 182/77 |
| 3,606,382 A | 9/1971 | Pollock | |
| 3,853,369 A | 12/1974 | Holden | |
| 3,858,905 A * | 1/1975 | Peebles | 280/163 |
| 3,865,399 A | 2/1975 | Way | |
| 3,889,997 A | 6/1975 | Schoneck | |
| 4,161,997 A | 7/1979 | Norman | |
| 4,169,623 A * | 10/1979 | Smith | 296/1.04 |
| 4,626,016 A * | 12/1986 | Bergsten | 296/1.02 |
| 4,711,282 A * | 12/1987 | Frazier et al. | 182/106 |
| 4,735,285 A * | 4/1988 | Ritten | 182/83 |
| 5,028,063 A * | 7/1991 | Andrews | 280/166 |
| 5,180,179 A * | 1/1993 | Salvucci | 280/47.315 |
| 5,205,603 A * | 4/1993 | Burdette, Jr. | 296/62 |
| 5,813,663 A * | 9/1998 | Victor et al. | 256/59 |
| 6,003,633 A * | 12/1999 | Rolson | 182/127 |
| 6,053,281 A * | 4/2000 | Murray | 182/113 |
| 6,116,378 A * | 9/2000 | Barrow | 182/127 |

(Continued)

FOREIGN PATENT DOCUMENTS

JP            2009161002 A   *   7/2009

*Primary Examiner* — Glenn Dayoan
*Assistant Examiner* — Paul Chenevert
(74) *Attorney, Agent, or Firm* — R. Randall Frisk

(57) ABSTRACT

An apparatus for accessing the bed of a pickup truck having a rear bumper and a tailgate includes a step assembly having a lower linkage assembly with first and second ends and being pivotally mounted at the first end to the rear truck bumper; an upper linkage assembly having third and fourth ends and being pivotally mounted at the third end to and proximal the distal edge of the truck tailgate and being pivotally mounted at the fourth end to the second end of the lower linkage assembly; and a step connected to the lower linkage assembly; and includes a handrail assembly including a handrail, a storage locking bracket assembly securing the handrail to the step assembly in an up, closed position, and an erected support assembly for securing the handrail in an upright, user assist position when the step assembly is in a lowered, open position.

8 Claims, 9 Drawing Sheets

(56) References Cited

U.S. PATENT DOCUMENTS

| | | | |
|---|---|---|---|
| 6,328,285 B1 * | 12/2001 | Wiseman | 256/59 |
| 6,425,572 B1 * | 7/2002 | Lehr | 256/1 |
| 6,505,708 B2 * | 1/2003 | LaBrash | 182/127 |
| 6,942,271 B1 * | 9/2005 | Jamison et al. | 296/61 |
| 6,964,444 B2 * | 11/2005 | Chumley et al. | 296/26.08 |
| 6,966,597 B2 | 11/2005 | Tegtmeier | |
| 6,971,478 B2 | 12/2005 | Bareket | |
| 6,994,362 B2 * | 2/2006 | Foster | 280/163 |
| 7,025,174 B1 * | 4/2006 | Hawley | 182/88 |
| 7,073,837 B2 | 7/2006 | Madlinger | |
| 7,090,276 B1 * | 8/2006 | Bruford et al. | 296/62 |
| 7,229,116 B1 * | 6/2007 | Bruford et al. | 296/57.1 |
| 7,240,947 B2 | 7/2007 | Kuznarik et al. | |
| 7,516,997 B2 * | 4/2009 | Kuznarik et al. | 296/62 |
| 7,530,619 B1 * | 5/2009 | Bruford et al. | 296/62 |
| 7,673,922 B1 * | 3/2010 | Grimes | 296/62 |
| 7,712,811 B2 * | 5/2010 | Heaman et al. | 296/26.08 |
| 7,954,836 B2 * | 6/2011 | Mann | 280/163 |
| 8,191,683 B2 * | 6/2012 | Rathbone et al. | 182/127 |
| 8,371,597 B2 * | 2/2013 | DeCrescenzo et al. | 280/164.1 |
| 8,444,201 B1 * | 5/2013 | Crawford et al. | 296/62 |
| 8,505,944 B2 * | 8/2013 | Genest et al. | 280/166 |
| 8,672,380 B2 * | 3/2014 | Carter et al. | 296/1.02 |
| 8,678,411 B2 * | 3/2014 | Kibler | 280/166 |
| 8,678,457 B1 * | 3/2014 | Duderstadt | 296/1.02 |
| 8,720,924 B2 * | 5/2014 | Ruehl | 280/164.1 |
| 2002/0070577 A1 | 6/2002 | Pool, III et al. | |
| 2006/0261623 A1 * | 11/2006 | Kuznarik | 296/62 |
| 2009/0322052 A1 * | 12/2009 | Ruehl | 280/166 |
| 2010/0181741 A1 * | 7/2010 | Webb | 280/166 |
| 2011/0168491 A1 * | 7/2011 | Cheatham, Jr. | 182/106 |
| 2013/0048400 A1 * | 2/2013 | Holdener et al. | 180/89.1 |
| 2013/0241242 A1 * | 9/2013 | Carter et al. | 296/203.01 |
| 2014/0203587 A1 * | 7/2014 | Krishnan et al. | 296/62 |

\* cited by examiner

APPARATUS AND METHOD FOR ACCESSING THE BED OF A PICKUP TRUCK

REFERENCE TO RELATED APPLICATIONS

The present application is a continuation-in-part of patent application Ser. No. 12/175,448, filed Jul. 17, 2008 now U.S. Pat. No. 8,091,943, which claims the benefit of U.S. Provisional Patent Application Ser. No. 60/959,724, filed Jul. 17, 2007 entitled "Tailgate Helper", which applications are hereby incorporated by reference in their entireties.

FIELD OF THE INVENTION

The present invention relates to steps, and more particularly to a folding step system for accessing the bed of a pickup truck.

BACKGROUND OF THE INVENTION

Pickup trucks have beds which are accessible through a tailgate hingedly mounted at the rear of the truck. When the tailgate is lowered to the open, generally horizontal position, it is about three feet or more above the ground, making it difficult and awkward for a person to climb up into the truck bed. This is especially troublesome when one or more persons are in the process of loading a large or heavy object into the truck bed. Numerous step assemblies have been devised to facilitate access to a truck bed or similar structure, examples of which are disclosed in the following patents and patent publication:

|  | Inventor |
|---|---|
| Pat. No. | |
| 7,240,947 | Kuznarik et al. |
| 7,073,837 | Madlinger |
| 6,966,597 | Tegtmeier |
| 4,161,997 | Norman |
| 3,889,997 | Schoneck |
| 3,865,399 | Way |
| 3,606,382 | Pollock |
| 1,223,639 | Swartsel |
| Pat. Publication No. | |
| 2002/0070577 | Pool, III et al. |

These and other assemblies are less than optimal, often being expensive, cumbersome, heavy, view obstructing, unstable and/or difficult to operate. Improvements are continually being sought.

SUMMARY OF THE INVENTION

An apparatus for accessing the bed of a pickup truck having a frame, a rear bumper and a tailgate having a distal edge and being hingedly mounted to the frame to move between an up, closed position and a lowered, open position, the apparatus including a step assembly including a lower linkage assembly having first and second ends and being pivotally mounted at the first end to the rear truck bumper at a first axis; an upper linkage assembly having third and fourth ends and being pivotally mounted at the third end to and proximal the distal edge of the truck tailgate at a second axis, and being pivotally mounted at the fourth end to the second end of the lower linkage assembly at a third axis; a step connected to the lower linkage assembly and having a distal edge; and including a handrail assembly including a handrail, a storage locking bracket assembly securing the handrail to the step assembly in the up, closed position, and an erected support assembly for securing the handrail in an upright, user assist position when said step assembly is in the lowered, open position.

It is an object of the present invention to provide an improved apparatus for accessing the bed of a pickup truck.

Other objects and advantages of the present invention will become apparent from the following description of the preferred embodiment.

BRIEF DESCRIPTION OF THE DRAWINGS

FIG. 1 is a perspective view of an apparatus 110 for accessing the bed of a pickup truck in accordance with another embodiment of the present invention, and showing apparatus 110 mounted to the truck 11 and in the up, closed position.

DESCRIPTION OF THE SELECTED EMBODIMENT

For the purposes of promoting an understanding of the principles of the invention, reference will now be made to the embodiments illustrated herein and specific language will be used to describe the same. It will nevertheless be understood that no limitation of the scope of the invention is thereby intended. Any alterations and further modifications in the described processes, systems or devices, and any further applications of the principles of the invention as described herein, are contemplated as would normally occur to one skilled in the art to which the invention relates.

Figure 1:
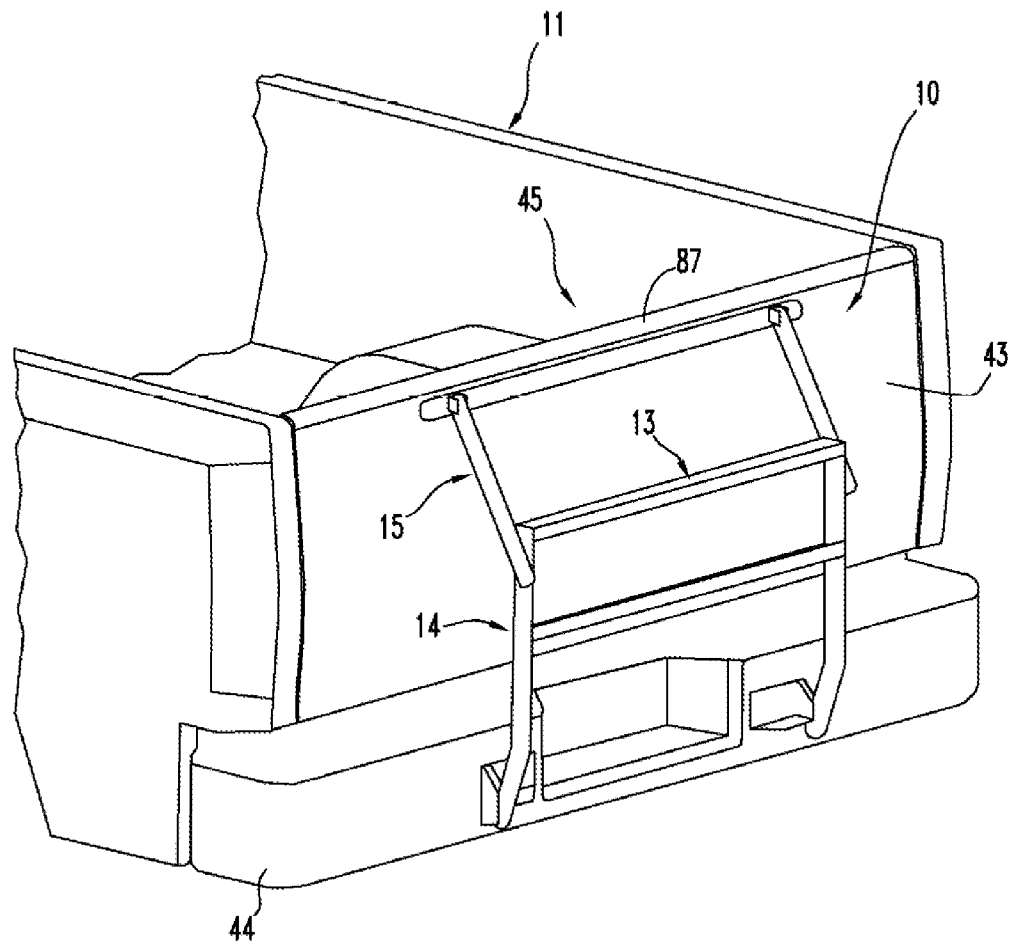
FIG. 1 is a perspective view of an apparatus 10 for accessing the bed of a pickup truck in accordance with one embodiment of the present invention, and showing apparatus 10 mounted to the truck 11 and in the up, closed position 45.
Figure 2:
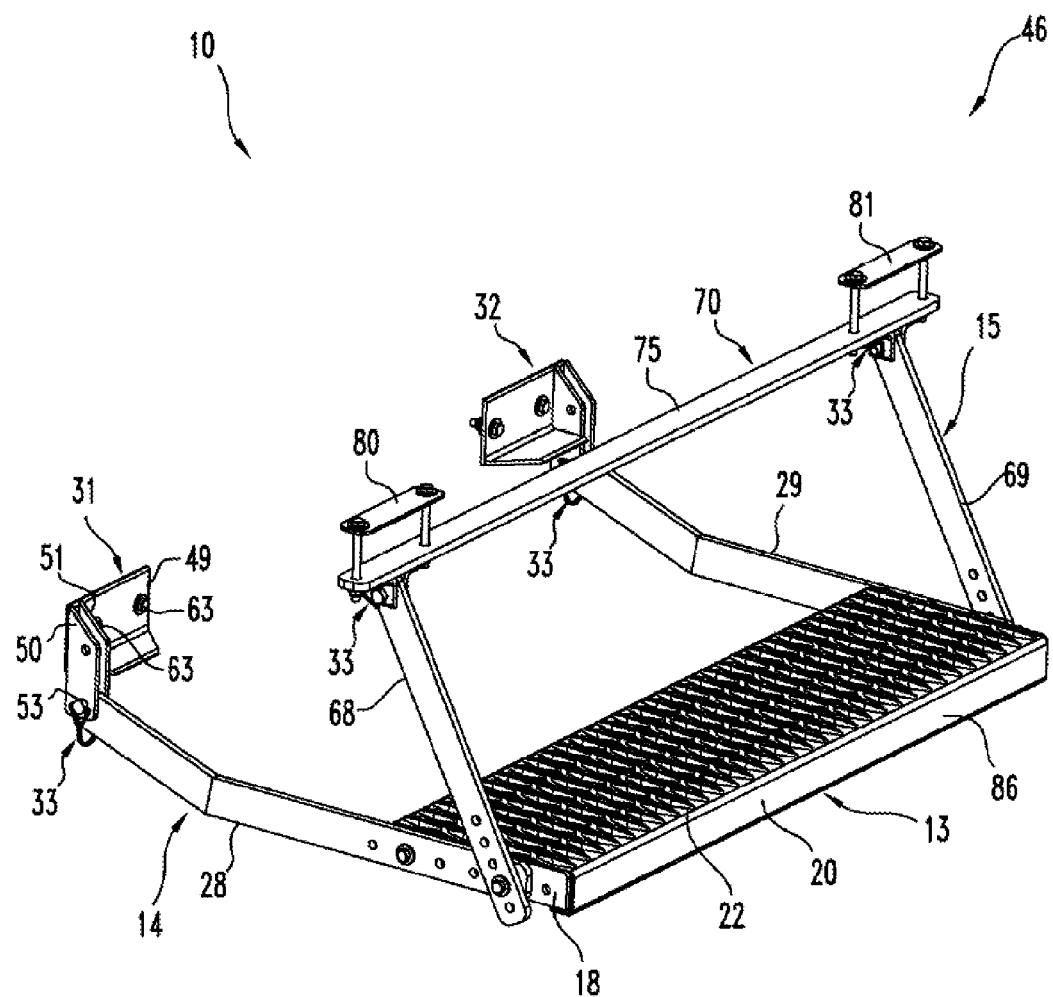
FIG. 2 is a perspective view of the apparatus 10 for accessing the bed of a pickup truck of FIG. 1, and showing apparatus 10 in the down, open position 46.
Figure 7:
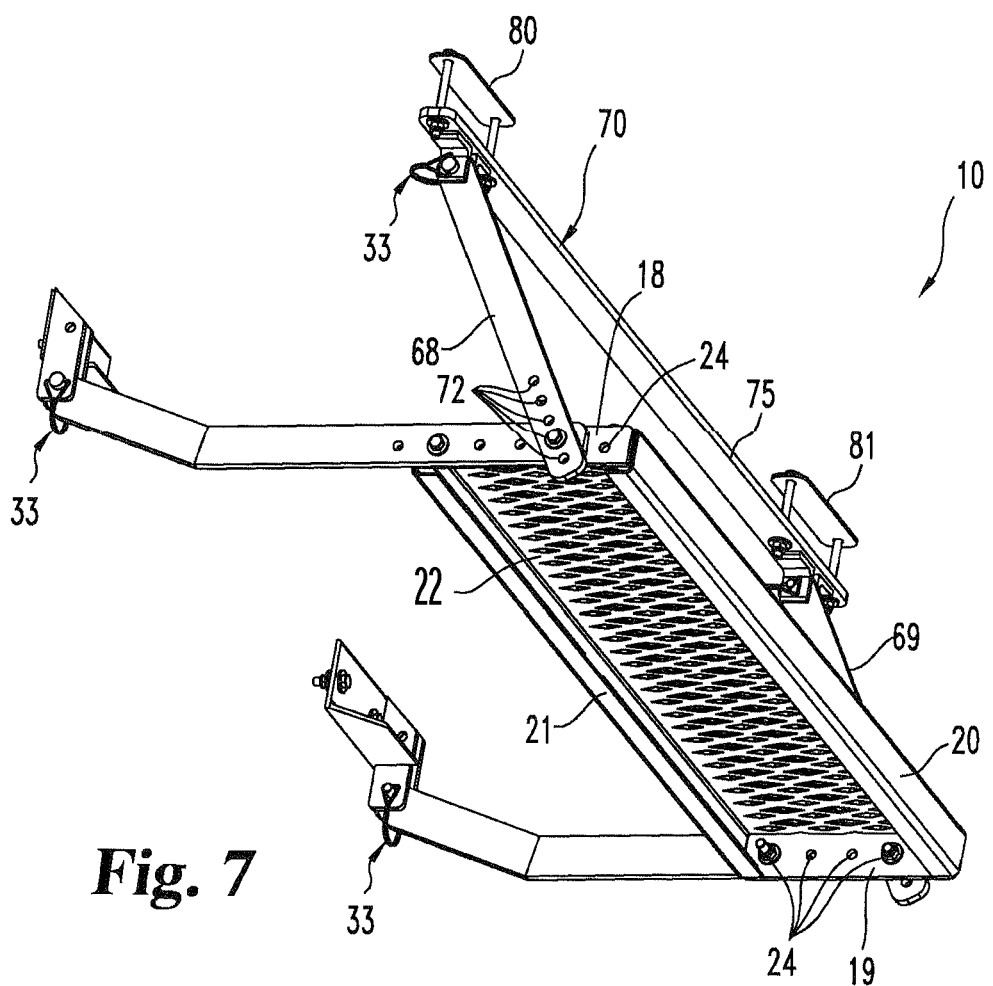
FIG. 7 is a perspective view of the apparatus 10 of FIG. 2 showing the underside of the apparatus 10.
Figure 8:
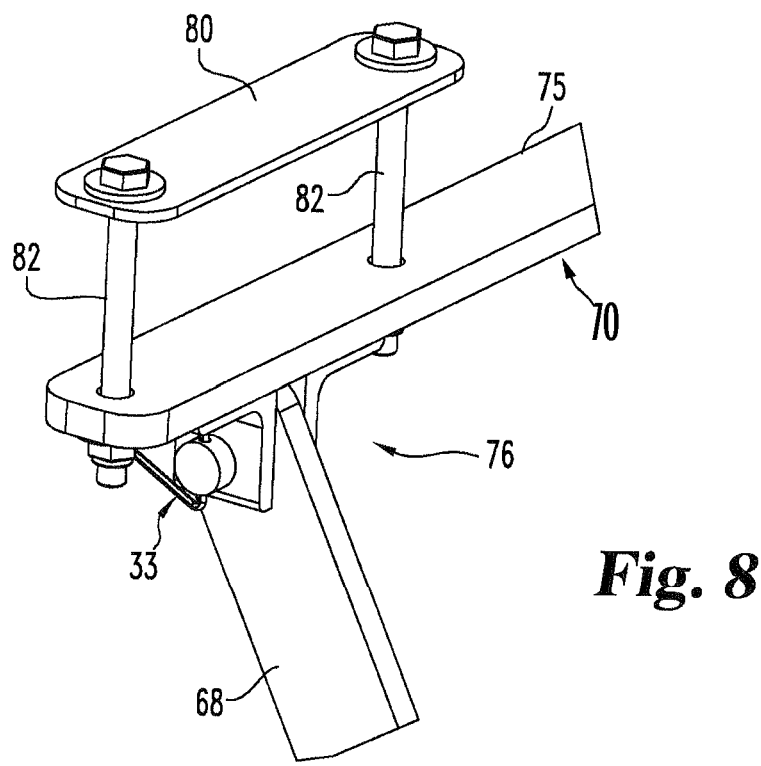
FIG. 8 is an enlarged perspective view of the left side of the tailgate mounting assembly 70 of the apparatus 10 of 2.
Figure 9:
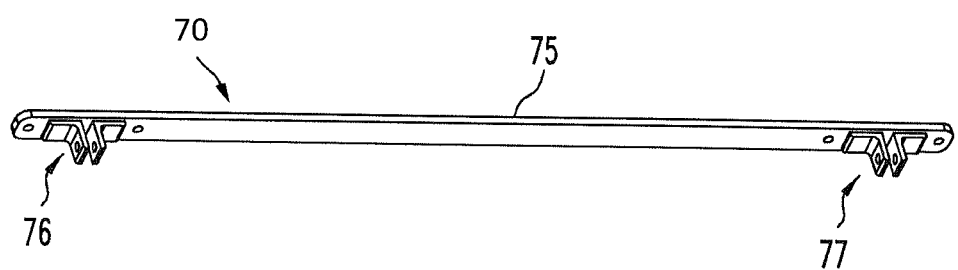
FIG. 9 is a perspective view of the mounting bar 75 of the tailgate mounting assembly 70 of the apparatus 10 of 2.

Referring to FIGS. 1, 2 and 7, there is shown an apparatus 10 for accessing the bed of a pickup truck 11 in accordance with the present invention. Apparatus 10 generally comprises a step 13, a lower linkage assembly 14 and an upper linkage assembly 15. Step 13 is generally rectangular with opposing side members 18 and 19, front and rear members 20 and 21, and a stair tread 22 supported thereabove. Stair tread 22 has a diamond or any desirable pattern to provide a sure and non-slip grip. Side members 18 and 19 each define a plurality of holes (as at 24) to provide variable mounting of step 13 to upper and lower linkage assemblies 14 and 15.

Figure 4:
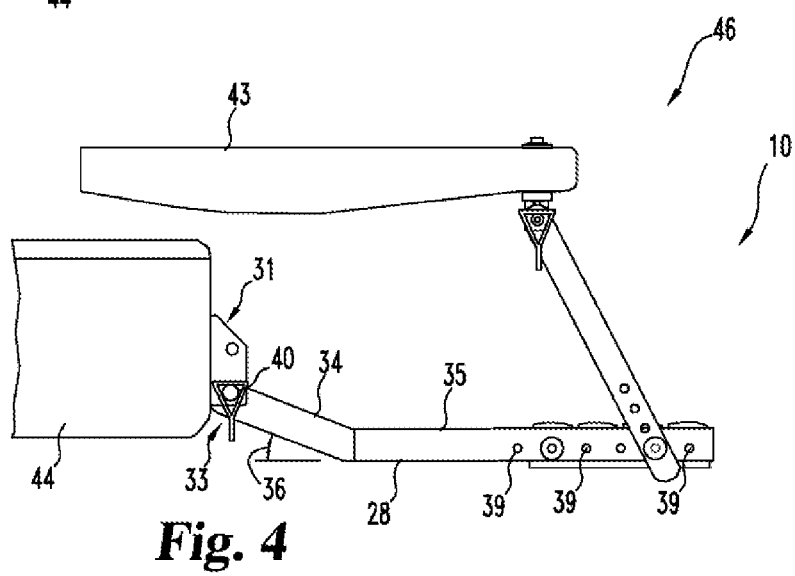
FIG. 4 is a side, elevational view of the apparatus 10 for accessing the bed of a pickup truck of FIG. 1, and showing the apparatus 10 in the down, open position 46.
Figure 5:
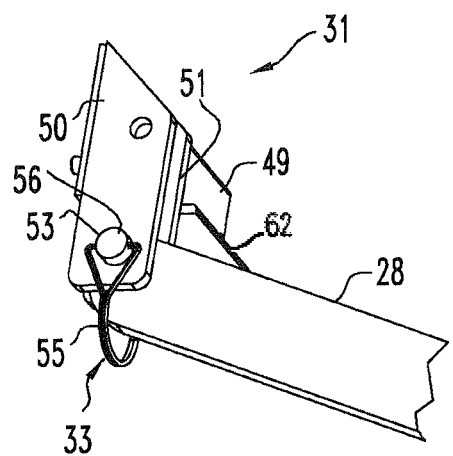
FIG. 5 is an enlarged perspective view of the left arm mount 31 of the apparatus 10 of FIG. 4.
Figure 6:
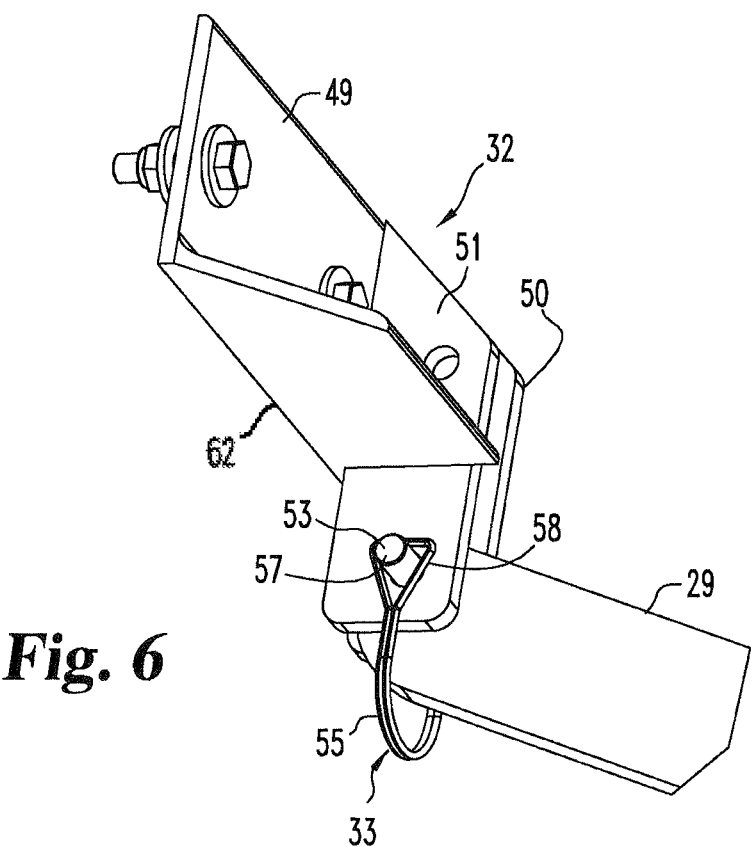
FIG. 6 is a perspective view of the right arm mount 32 of the apparatus 10 of FIG. 4.

Bottom linkage assembly 14 includes identical left and right step arms 28 and 29, left and right arm mounts 31 and 32, and quick release pin assemblies 33. Referring to FIG. 4, left arm 28 includes a mounting section 34 and a step section 35 that extends at a lift advantage angle 36 of approximately 20 degrees relative to mounting section 34. At its distal end, step section 35 defines a plurality of mounting holes 39 (here, six holes) for variable connection with step 13 and with upper linkage assembly 15. At its proximal end, mounting section 34 defines a hole 40 for mounting to a corresponding arm mount 31/32.

The truck 11 is typical of pickup trucks and has a tailgate 43 and a rear bumper 44. Tailgate 43 is hingedly connected to truck 11 to move between an up, closed position 45 (FIGS. 1 and 3) and a lowered, open position 46 (FIGS. 2 and 4). Bumper 44 extends rearwardly of the tailgate 43 when tailgate 43 is in the up, closed position. In the lowered, open position 46, tailgate 43 is pivoted about its hinge (not shown) to a generally horizontal position (FIG. 4) whereby the majority of tailgate 43 extends rearwardly of bumper 44.

Referring to FIGS. 2 through 6, left and right arm mounts 31 and 32 are mirror images of each other. Left arm mount 31 includes a back plate 49 and a pair of shackle plates 50 and 51, between which extends the proximal end of left step arm 28. Through aligned holes in step arm 28 and shackle plates 50 and 51 extends a quick release pin 53 of quick release pin assembly 33. A spring load keep 55 is pivotally held by the head 56 of pin 53 and loops therefrom around to the opposing end 57 of pin 53 where its triangular loop 58 is pulled, against the bias of the lower loop 59 of keep 55, over the protruding end 57 of pin 53. Pin 53 is thereby securely held in place as an axle about which left step arm 28 pivots relative to left arm mount 31. Right step arm 29 is similarly mounted and pivots relative to right arm mount 32. Each of arm mount 31 and 32 is also provided with strengthening gussets 62. Left and right arm mounts 31 and 32 are securely attached to the bumper 44 by bolts 63 or any other suitable connector. The lower linkage assembly 14 can thus be easily and securely connected with and removed from bumper 44 via the quick connect assemblies 33.

Referring to FIGS. 2, 4 and 7 through 9, upper linkage assembly 15 includes left and right tailgate arms 68 and 69, tailgate mounting assembly 70, and quick release pin assemblies 33. Left and right tailgate arms 68 and 69 are identical and are generally straight links, each defining at its proximal end a hole 71 to mount to tailgate mounting assembly 70 and, at its distal end, a plurality of holes (72) to mount to lower linkage assembly 14 and step 13.

Tailgate mounting assembly 70 includes a mounting bar 75 with opposing left and right pairs of shackle plates 76 and 77, which pivotally receive therein the proximal ends of left and right tailgate mounting arms 68 and 69, respectively. Mounting arms 68 and 69 are pivotally held between the pairs of shackle plates 76/77 by quick release pin assemblies 33, as are used to mount lower linkage assembly 14 to bumper 44. Mounting bar 75 is secured to the upper edge of tailgate 43 by bolts or any other suitable connecters to ensure a solid and fixed, but removable connection. Where the tailgate or similar vehicle structure is made of a sufficiently strong material such as steel, bolts through mounting bar 75 are sufficient to achieve a solid and reliable connection. If the tailgate is made of a weaker material such as aluminum, back plates 80 and 81 are positioned on the inside of tailgate 43, and the securing bolts 82 extend therethrough, as well.

Figure 3:
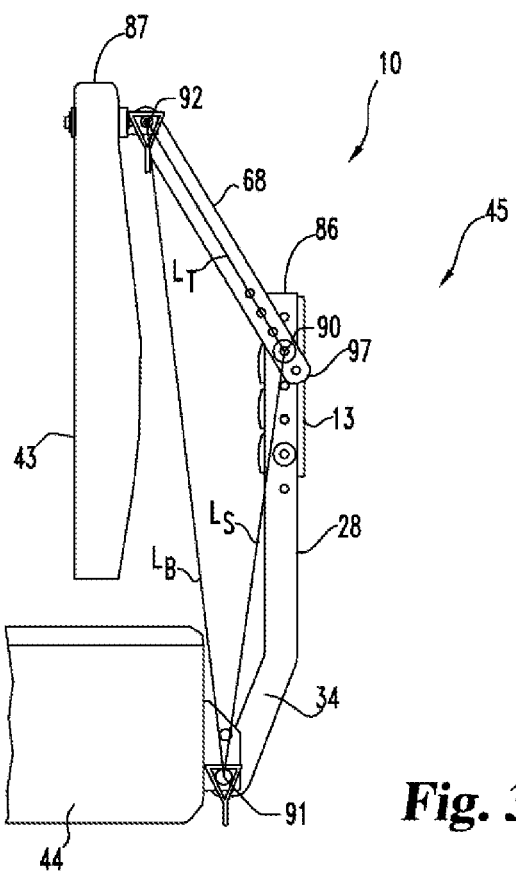
FIG. 3 is a side, elevational view of the apparatus 10 for accessing the bed of a pickup truck of FIG. 1.

In assembly and in the upper, closed position 45, apparatus 10 is characterized in that the distal edge 86 of step 13 is below the distal edge 87 (and in this closed position 45, it is the upper edge) of tailgate 43. That is, apparatus 10 poses no obstruction to the view from the vehicle cab over the top of the closed tailgate. In one embodiment, the effective length $L_S$ of the identical step arms 28 and 29 (e.g. the assembled length as measured from the axes of their pivotal connections, i.e. from pin 90 to pin 91 in FIG. 3) to the effective length $L_T$ of the identical tailgate arms 68 and 69 (from their pivot connection at pins 90 and 92) to the effective length $L_B$ of the bumper to tailgate connection (from their pivot connections at pins 91 and 92) is approximately 2.9 to 1.8 to 4.5. This relationship results in the top distal edge of the step 13 being below the top edge of tailgate 43 in the up, closed position 45. In the down position, the step 13 is horizontal, and closing the apparatus 10 and tailgate 43 is facilitated over just closing the tailgate 43. This is due in part because the lifting point by the user's hand is lifting the outer edge of the step 13, which is lower than the tailgate edge. For most adults, this lower lift engagement distributes the workload to not only the arms and shoulders (which bear the brunt of the lifting action when closing just a tailgate), but also to the legs and back, each body area sharing a smaller overall lifting force. This relationship is contemplated to be distributed differently for different vehicles where the tailgate and bumper distance is different. However, the mounting locations of the arm mounts 31/32 and tailgate mounting assembly 70 is contemplated to be made so that the distal edge 86 of step 13 in the up position 45 is not only below the upper edge 87, but as much as 7 to 10 inches below the upper edge 87, as shown in FIG. 3.

As seen in FIG. 4, the step 13 is mostly, though not entirely rearwardly of the distal edge 87 of tailgate 43 in the lowered, open position 46. Also in the lowered, open position, as shown in FIG. 4, the left and right tailgate arms 68 and 69 pivotally connect with the left and right step arms 28 and 29 at an angle of about 60 degrees and proximal the distal edge of step 13. Also, in the up, closed position 45, apparatus 10 has a very narrow profile. That is the rearmost surface 97 of apparatus 10 (which may be the distal end of arm 68 or the bottom of step 13) is minimized, essentially extending rearwardly of the mounting at pin 91 approximately only the distance equal to the length of mounting section 34 times the sine of the lift advantage angle 36.

Referring to FIGS. 10-13, there is shown an apparatus 110 for accessing the bed of a pickup truck in accordance with another embodiment of the present invention. Apparatus 110 is substantially the same as apparatus 10 of FIGS. 1-9 except for the addition of a handrail assembly 111, and like reference numbers will be used for like elements of apparatus 110, unless specified. Apparatus 110 thus includes apparatus 10 and handrail assembly 111.

Figure 10:
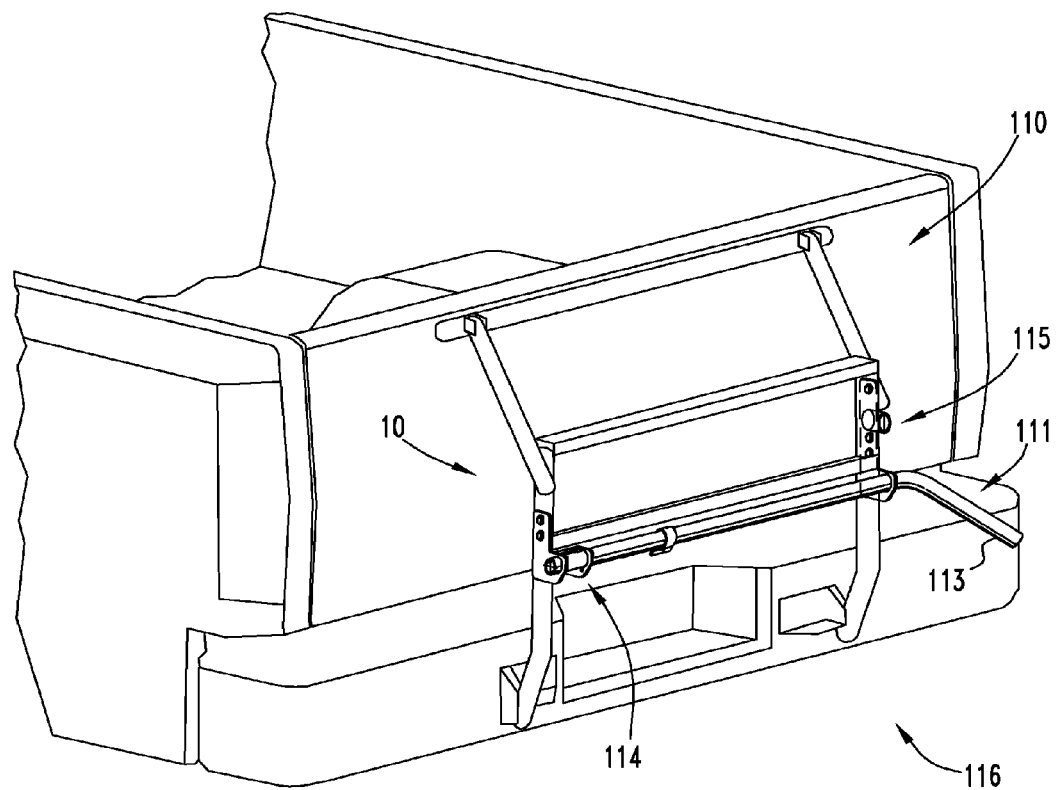
FIG. 10 is
Figure 11:
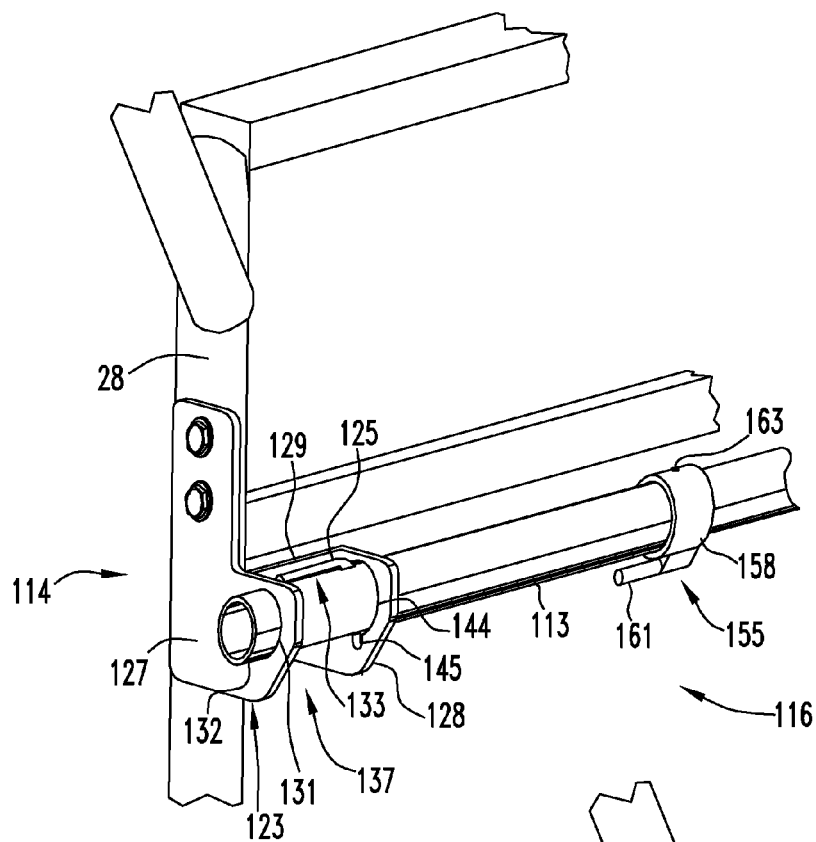
FIG. 11 is an enlarged, perspective view of the left side portion of the handrail assembly 111 of apparatus 110.

Handrail assembly 111 generally includes a handrail 113, a storage locking bracket assembly 114, and an erected support assembly 115. Handrail assembly 111 includes a storage and transport position 116 and an erected position 117. Handrail assembly 111 comprises an elongate member that is sized and configured to be held for lateral storage and transport by the apparatus 10, as shown in FIG. 10. It is made of round tubing, but other shapes are contemplated. It is generally straight for a length slightly longer than the distance between step arms 28 and 29. It then angles at 118 between about 30 and 45 degrees and then forms another, shorter straight section, which forms the upper hand grip 119. Other angles and lengths of the hand grip section 119 are contemplated as desired, but the angled portion 118 forms a function in helping to retain the handrail 113 in place during storage and transport. The length of hand grip 119 is set to be short enough to enable handrail 113 to be rotated within its holding brackets and for hand grip 119 to readily clear the truck bumper or any other obstruction in the hand grip's area of rotation.

Storage locking bracket assembly 114 includes a first step arm bracket 123, a second step arm bracket 124 and a locking pin 125. First step arm bracket 123 has left and right plates 127 and 128 and interconnecting plate 129 that rigidly holds plates 127 and 128 generally parallel to each other. First step arm bracket 123 is fixedly connected to step arm 28 by appropriate means such as bolts or welding. Plate 127 defines a hole 131 through which the distal end 132 of handrail 113 extends, as shown. Locking pin 125 extends outwardly and then toward the distal end 132 of handrail assembly 111, thereby forming a locking pin engagement gap 133 between locking pin 125 and handrail assembly 111, as shown. Plates 127 and 128 are spaced apart to define a locking pin gap 137 that is wide enough to receive locking pin 125 therein in the handrail assembly storage position 116.

Right plate 128 defines a keyhole 144 with a recess 145 that is sized to receive the end of handrail 113, including the locking pin 125 when handrail 113 is rotated such that the locking pin 125 is turned downwardly. Keyhole 144 is coaxial with hole 131. Once locking pin 125 is positioned between left and right plates 127 and 128, handrail 113 is rotated so that locking pin 125 is facing upwardly and past top dead center, resting slightly against interconnecting plate 129. In this position, the hand grip section 119 of handrail 113 is pointing straight down, thus with a gravity assist, locking pin 125 is held away from recess 145, between plates 127 and 128, and handrail 113 is held in this, the storage and transport position 116 while driving down the road.

The second step arm bracket 124 includes a handrail holding portion 148, a mounting section 149 and a holding sleeve 150. The handrail holding portion 148 defines a hole 152 sized to receive the handrail tube therethrough. To remove handrail 113, handrail 113 is first rotated to align locking pin 125 with recess 145 of keyhole 144 in right plate 128, thus allowing distal end 132 of handrail 113 to be slid through left and right plates 127 and 128. Once distal end 132 of handrail 113 is clear of plates 127 and 128, handrail 113 is angled slightly away from the horizontal to allow the upper hand grip 119 to be slid the opposite direction through handrail holding portion 148. To stow handrail 113, the hand grip portion 119 is first extended from between plates 127 and 128 and outwardly until the distal end 132 can be inserted through keyhole 144 and then through the end 131. Locking pin 125 extends through the recess 145 of keyhole 144, and then handrail 113 is rotated as described to hold handrail 113 in the storage and transport position 116.

Figure 12:
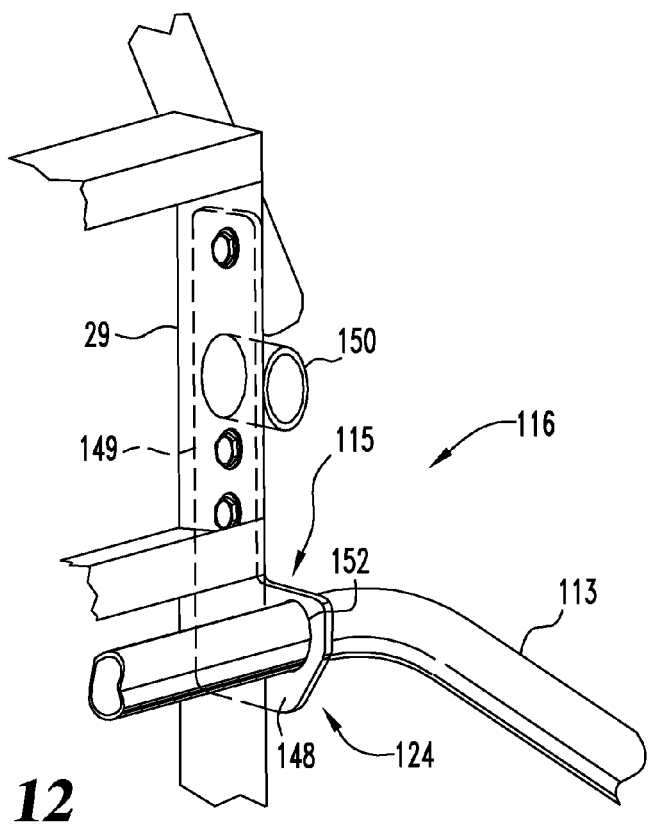
FIG. 12 is an enlarged, perspective view of the right side portion of the handrail assembly 111 of apparatus 110.
Figure 13:
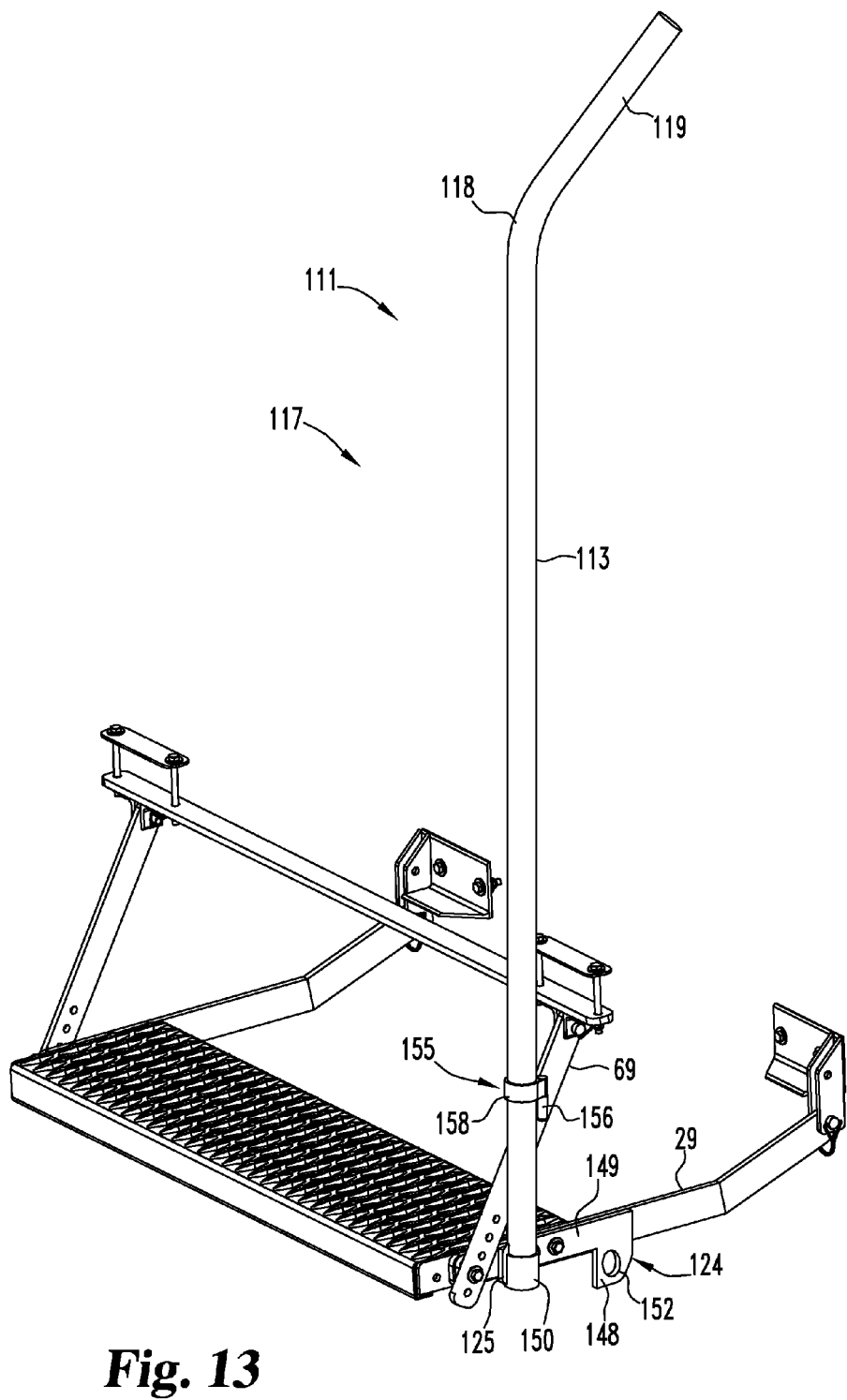
FIG. 13 is a perspective view of the handrail assembly 111 of apparatus 110 of FIG. 1 and shown in the erected position 117.

Referring to FIGS. 12 and 13, holding sleeve 150 is sized and configured to receive therein the distal end 132 of handrail 113. Thus in the present embodiment, sleeve 150 has a round cross-sectional opening. Holding sleeve 150 is fixed to mounting section 149 so that the axis of holding sleeve 150 is generally vertical when apparatus 10 is in the down, open position 46 (FIG. 1). Second step arm bracket 124 is fixedly mounted to right step arm 29 by appropriate means such as bolts or welding. It is contemplated that both first step arm bracket 123 and second step arm bracket 124 define multiple holes (some shown) to enable variable mounting configurations, as with the step arms 28 and 29, the tailgate arms 68 and 69 and the step 13.

The erected support assembly 115 includes the holding sleeve 150 of second step arm bracket 124, an upper locking collar assembly 155 and an upper pin sleeve 156. Upper locking collar assembly 155 includes a collar 158 and an upper locking pin 161 rigidly connected to collar 158. Collar 158 surrounds handrail tube 113 and is fixed in the desired position by appropriate means such as a set screw 163. Upper locking pin 161 extends outwardly of collar 158 and then toward distal end 132, as shown. Upper pin sleeve 156 is fixedly connected to right tailgate arm 69 by appropriate means such as welding or bolts, as desired. A bolt screw configuration is contemplated to enable ready adjustment, but any appropriate means for a rigid and preferably variable connection with right tailgate arm 69 is contemplated to enable the handrail 113 to be assembled in a substantially vertical position, as shown.

To position handrail 113 in the erected position 117, handrail 113 is lowered so that distal end enters holding sleeve 150 whereby locking pin 125 positions outside of sleeve 150, and whereby upper locking 161 is received within upper pin sleeve 156. The size of locking pin engagement gap 133 is made, relative to the thickness of the wall of holding sleeve 150 to provide whatever degree of tightness when handrail 113 is erected. Alternatively and/or in addition, the diameter of upper locking pin 161 and the inner diameter of sleeve 156 can be made to provide a close tolerance and tight fit, if desired. Alternative embodiments are contemplated wherein additional structure is employed to rigidly, but removably secure handrail 113 to the step apparatus 10 so that handrail 113 does not easily come detached therefrom until desired.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. An apparatus for accessing the bed of a pickup truck having a frame, a rear bumper and a tailgate having a distal edge and being hingedly mounted to the frame to move between an up, closed position and a lowered, open position, the apparatus comprising:

a step assembly including a lower linkage assembly having first and second ends and being pivotally mounted at the first end to the rear truck bumper at a first axis; an upper linkage assembly having third and fourth ends and being pivotally mounted at the third end to and proximal the distal edge of the truck tailgate at second axis, and being pivotally mounted at the fourth end to the second end of the lower linkage assembly at a third axis; and a step connected to the lower linkage assembly and having a distal edge;

a handrail assembly including a handrail configured for connection to the step assembly to extend substantially vertically therefrom and an erected support assembly for securing the handrail for use in an upright, user assist position to said step assembly when said step assembly is in the lowered, open position;

wherein the handrail has a bottom end and a locking pin, and the erected support assembly includes a first sleeve connected to the lower linkage and sized to receive therein the bottom end of the handrail to secure the handrail for use; and wherein the erected support assembly includes a second sleeve connected to the upper linkage assembly and sized and configured to receive therein a second locking pin to secure the handrail for use.

2. The apparatus for accessing the bed of a pickup truck of claim 1 wherein said handrail assembly further includes a storage locking bracket assembly connected with said step assembly and for securing the handrail for storage during transport when said step assembly in the up, closed position.

3. The apparatus for accessing the bed of a pickup truck of claim 2 wherein the storage locking bracket assembly includes a plate that defines a keyhole and the handrail includes a pin that is configured to extend through the keyhole and, upon twisting of the handrail, lock the handrail in the storage locking bracket for transport.

4. An apparatus for accessing the bed of a pickup truck having a frame, a rear bumper and a tailgate having a distal edge and being hingedly mounted to the frame to move between an up, closed position and a lowered, open position, the apparatus comprising:
- a step assembly including a lower linkage assembly having first and second ends and being pivotally mounted at the first end to the rear truck bumper at a first axis; an upper linkage assembly having third and fourth ends and being pivotally mounted at the third end to and proximal the distal edge of the truck tailgate at a second axis, and being pivotally mounted at the fourth end to the second end of the lower linkage assembly at a third axis; and a step connected to the lower linkage assembly and having a distal edge;
- a handrail assembly including a handrail configured for removable connection the step assembly when the tailgate and step assembly are moved to the lowered, open position and an erected support assembly for securing the handrail for use in an upright, user assist position to said step assembly when said step assembly in the lowered, open position;
- wherein the handrail has a bottom end and a locking pin, and the erected support assembly includes a first sleeve connected to the lower linkage and sized to receive therein the bottom end of the handrail to secure the handrail for use; and
- wherein the erected support assembly includes a second sleeve connected to the upper linkage assembly and sized and configured to receive therein a second locking pin to secure the handrail for use.

5. The apparatus for accessing the bed of a pickup truck of claim 4 wherein said handrail assembly further includes a storage locking bracket assembly connected with said step assembly and for securing the handrail for storage during transport when said step assembly is in the up, closed position.

6. The apparatus for accessing the bed of a pickup truck of claim 5 wherein the storage locking bracket assembly includes a plate that defines a keyhole and the handrail includes a pin that is configured to extend through the keyhole and, upon twisting of the handrail, lock the handrail in the storage locking bracket for transport.

7. The apparatus for accessing the bed of a pickup truck of claim 4 wherein, when connected to the step assembly, the handrail extends substantially vertically therefrom.

8. An apparatus for accessing the bed of a pickup truck having a frame, a rear bumper and a tailgate having a distal edge and being hingedly mounted to the frame to move between an up, closed position and a lowered, open position, the apparatus comprising:
- a step assembly including a lower linkage assembly pivotally mounted to the rear truck bumper, an upper linkage assembly pivotally mounted to and proximal the distal edge of the truck tailgate pivotally mounted to the lower linkage assembly; and a step connected to the lower linkage assembly, and wherein said step assembly is movable with the tailgate between the up, closed position and the lowered, open position;
- a handrail assembly including a handrail configured for removable connection to the step assembly when the tailgate and step assembly are in the lowered, open position and an erected support assembly for securing the handrail for use in an upright, user assist position to said step assembly when said step assembly is in the lowered, open position;
- wherein the handrail has a bottom end and a locking pin, and the erected support assembly includes a first sleeve connected to the lower linkage and sized to receive therein the bottom end of the handrail to secure the handrail for use; and
- wherein the erected support assembly includes a second sleeve connected to the upper linkage assembly and sized and configured to receive therein a second locking pin to secure the handrail for use.

* * * * *